US012674337B2

(12) United States Patent
Smart et al.

(10) Patent No.: US 12,674,337 B2
(45) Date of Patent: Jul. 7, 2026

(54) ROOFTOP TENT FOR MOUNTING TO A VEHICLE

(71) Applicant: ARB Corporation Limited, Kilsyth (AU)

(72) Inventors: Stuart Douglas Smart, Kilsyth (AU); James Somerville King, Kilsyth (AU); John Desmond Clark, Kilsyth (AU); Andrew Harry Brown, Kilsyth (AU)

(73) Assignee: ARB Corporation Limited, Kilsyth (AU)

( * ) Notice: Subject to any disclaimer, the term of this patent is extended or adjusted under 35 U.S.C. 154(b) by 225 days.

(21) Appl. No.: 18/693,499

(22) PCT Filed: Sep. 20, 2022

(86) PCT No.: PCT/AU2022/051130
§ 371 (c)(1),
(2) Date: Mar. 19, 2024

(87) PCT Pub. No.: WO2023/044527
PCT Pub. Date: Mar. 30, 2023

(65) Prior Publication Data
US 2024/0426130 A1      Dec. 26, 2024

(30) Foreign Application Priority Data
Sep. 22, 2021    (AU) ................................ 2021903047

(51) Int. Cl.
E04H 15/06        (2006.01)
B60P 3/38         (2006.01)
E04H 15/00        (2006.01)

(52) U.S. Cl.
CPC ................ E04H 15/06 (2013.01); B60P 3/38 (2013.01); E04H 15/008 (2013.01)

(58) Field of Classification Search
CPC ........... E06C 1/387; E06C 7/42; E04H 15/06
See application file for complete search history.

(56) References Cited

U.S. PATENT DOCUMENTS 1,007,574 A     10/1911   Jobson
1,220,337 A  *   3/1917   Hornthal ................. E06C 1/387
182/161

(Continued)

FOREIGN PATENT DOCUMENTS

CN        106004631 A     10/2016
KR        2022069169 A     5/2022

*Primary Examiner* — Noah Chandler Hawk
(74) *Attorney, Agent, or Firm* — Schwabe, Williamson & Wyatt, P.C.

(57)                ABSTRACT

Rooftop tent (10) for mounting to a vehicle (12). The rooftop tent (10) includes a base (14) configured for mounting to the vehicle (12), a cover (18) shaped to extend across the base (14), flexible walls (20) secured between the base (14) and the cover (18), at least one opening mechanism (24) configured to move the cover (18) relative to the base (14), and at least one retraction mechanism (26) configured to draw the walls (20) inwardly to be under the cover (18). The, or each, opening mechanism (24) is secured between the base (14) and the cover (18) to be outside of, and separate from, the walls (20). The, or each, opening mechanism (24) and the, or each, retraction mechanism (26) are operable concurrently to move the cover (18) towards the base (14) and simultaneously draw the walls (20) inwardly.

19 Claims, 8 Drawing Sheets

(56)         References Cited

U.S. PATENT DOCUMENTS

| | | | | |
|---|---|---|---|---|
| 2,811,725 | A * | 11/1957 | Cence | B60P 3/38 |
| | | | | 135/117 |
| 3,351,078 | A * | 11/1967 | Kleiman | B60P 3/38 |
| | | | | 135/153 |
| 3,375,836 | A * | 4/1968 | Domeneghetti | E04H 15/06 |
| | | | | 135/132 |
| 4,366,979 | A * | 1/1983 | Pillot | B60P 3/38 |
| | | | | 296/160 |
| 9,222,278 | B2 | 12/2015 | Park | |
| 9,499,999 | B2 * | 11/2016 | Zhou | E04H 15/008 |
| 10,125,517 | B2 * | 11/2018 | Xu | B60P 3/34 |
| 10,422,183 | B2 * | 9/2019 | Frick | E06C 7/183 |
| 10,612,303 | B2 * | 4/2020 | Parker | E06C 7/426 |
| 10,920,445 | B2 | 2/2021 | Montesalvo | |
| 11,352,777 | B2 * | 6/2022 | Chinn | E04B 1/3445 |
| 12,428,868 | B2 * | 9/2025 | Lee | B60P 3/39 |
| 12,442,248 | B1 * | 10/2025 | Lytle | E06C 7/006 |
| 2003/0094827 | A1 | 5/2003 | Faludy et al. | |
| 2006/0272896 | A1 * | 12/2006 | Rajewski | E06C 1/36 |
| | | | | 182/127 |
| 2023/0383565 | A1 * | 11/2023 | Ko | E04H 15/54 |

* cited by examiner

ROOFTOP TENT FOR MOUNTING TO A VEHICLE

CROSS-REFERENCE TO RELATED APPLICATIONS

This application claims priority to Australian provisional patent application no. 2021903047, filed 22 Sep. 2021, and is the national phase of International patent application no. PCT/AU2022/051130, the contents of which are incorporated herein in their entirety.

TECHNICAL FIELD

The present disclosure relates, generally, to tents for accommodating users when camping, and, particularly, to rooftop tents for mounting on a vehicle.

BACKGROUND

Many different types of tent exist to allow accommodating users in different environments or otherwise satisfy particular use requirements. For users who require driving off-road (also referred to as 'four-wheel-driving') to camping destinations, rooftop tents are popular, as these allow erecting the tent rapidly and require minimal space in addition to that occupied by the vehicle when erected.

Vehicle-mounted rooftop tents are typically mounted to one of roof bars or a roof rack secured to the roof of the vehicle, roof rails mounted on the vehicle's cabin, a support structure, such as a hard-shell canopy or a load rest support rail system mounted across a tub/cargo bay of a utility vehicle (sometimes referred to as a 'pick-up truck'), or to a roof of a trailer or caravan towed by a vehicle. A rooftop tent typically comprises an openable structure carrying flexible, fabric walls. Some tents include a clam-shell structure, or pivotable platform, mountable to the roof operable to be pivoted away from, and typically cantilevered off, the roof to arrange the fabric walls in a dome-like arrangement to form an enclosure. Other tents include a pair of housings which are mountable to the roof and movable apart in a linear direct to stretch the walls between the shells to form the enclosure. The openable structure is operable manually or with an electrically powered drive mechanism.

A prominent advantage of a rooftop tent is the speed of erecting or packing away the tent. This can substantially enhance user experience and consequently increase enthusiasm for camping. However, many rooftop tents require user effort to completely pack the walls away, requiring the user to stuff the walls inside of the housings or within a cover, which requires time and can be difficult to access, particularly when the tent is mounted on the top of a tall vehicle. Also, accessing the inside of the tent, when erected, can be challenging for some users, particularly young children, elderly, or less able bodied persons, particularly when the tent is mounted on a tall vehicle.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to one aspect of the disclosure, there is provided a rooftop tent for mounting to a vehicle. the rooftop tent including a base configured for mounting to the vehicle, a cover shaped to extend across the base, flexible walls secured between the base and the cover, at least one opening mechanism configured to move the cover relative to the base, the, or each, opening mechanism secured between the base and the cover to be outside of, and separate from, the walls, and at least one retraction mechanism configured to draw the walls inwardly to be under the cover. The, or each, opening mechanism and the, or each, retraction mechanism are operable, and typically configured to operate, concurrently to move the cover towards the base and simultaneously draw the walls inwardly.

Each of the base and the cover may define an operatively front end and an operatively rear end, and the walls define a door at a side between the front end and rear end. In such embodiments, a pair of the opening mechanisms may be spaced apart such that each opening mechanism is arranged at one of the front end and the rear end, and outside of the walls.

The, or each, opening mechanism may include an electrically powered mechanism operable to tension the walls between the cover and the base.

The cover may be arranged separately from the base, and the, or each, opening mechanism be arranged to move the cover towards and away from the base in a linear direction.

The rooftop tent may include a plurality of the retraction mechanisms, each retraction mechanism including a pair of elongate members pivotable about a hinge and arranged such that each elongate member is secured to at least one of the walls. Operating the plurality of retraction mechanisms allows the elongate members to pivot towards each other to draw the walls inwardly.

The walls may define opposed side walls, a front wall, and a rear wall, and at least one of the retraction mechanisms may be secured to each of the walls.

Each elongate member may include an arm, and the walls may define sleeves shaped to receive the arms.

The hinge of each retraction mechanism may bias the elongate members towards each other. This arrangement may cause folding of the walls inwardly when the, or each, opening mechanism is operated.

The rooftop tent may also include a foldable ladder, the ladder having a pair of spaced side rails and a plurality of treads secured between the side rails, each tread being pivotable relative to the side rails to allow pivoting between a use configuration, where the treads are rotated to extend transversely to the rails to allow supporting a user, and a storage configuration, where the treads are rotated to be substantially in line with the rails, and at least one of the base and the cover is shaped to receive the ladder when in the storage configuration.

The ladder may include a pair of elongate handrails, each handrail pivotally mounted to one of the side rails, the handrails pivotable between a storage position, where the handrails are rotated towards each other and the treads, and a use position, where the handrails are rotated apart from each other to allow being grasped by a user supported on the treads. In such embodiments, the ladder may include a pair of locking mechanisms, each locking mechanism arranged at an end of one of the handrails and operable to rotationally lock the handrail relative to the side rail in the use position or in the storage position.

The cover may be configured to carry the ladder and include a pair of tracks arranged to support the ladder, and the ladder be slidable along the tracks.

Each side rail of the ladder may include a hook arranged at one end, and each track define a lip, and sliding the ladder along the tracks in a direction away from the cover causes the hooks to catch on the lips to inhibit further linear movement, and allow pivoting the ladder about the lip and towards the ground.

Each side rail of the ladder may include a levelling mechanism to allow adjusting a length of the side rail.

According to another aspect of the disclosure, there is provided a rooftop tent for mounting to a vehicle, the rooftop tent including a base configured for mounting to the vehicle, a cover shaped to cover the base, flexible walls secured between the base and the cover, at least one opening mechanism configured to move the cover relative to the base, and a foldable ladder having a pair of spaced side rails and a plurality of treads secured between the side rails, each tread being pivotable relative to the side rails to allow pivoting between a use configuration, where the treads are rotated to extend transversely to the rails to allow supporting a user, and a storage configuration, where the treads are rotated to be substantially in line with the rails, where at least one of the base and the cover is shaped to receive the ladder when in the storage configuration.

The ladder may include a pair of elongate handrails, each handrail pivotally mounted to one of the side rails, the handrails pivotable between a storage position, where the handrails are rotated towards each other and the treads, and a use position, where the handrails are rotated apart from each other to allow being grasped by a user supported on the treads. In such embodiments, the ladder may include a pair of locking mechanisms, each locking mechanism arranged at an end of one of the handrails and operable to rotationally lock the handrail relative to the side rail in the use position or in the storage position.

The cover may be configured to carry the ladder and include a pair of tracks arranged to support the ladder, and the ladder be slidable along the tracks.

Each side rail of the ladder may include a hook arranged at one end, and each track define a lip, and sliding the ladder along the tracks in a direction away from the cover causes the hooks to catch on the lips to inhibit further linear movement, and allow pivoting the ladder about the lip and towards the ground.

Each side rail of the ladder may include a levelling mechanism to allow adjusting a length of the side rail.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
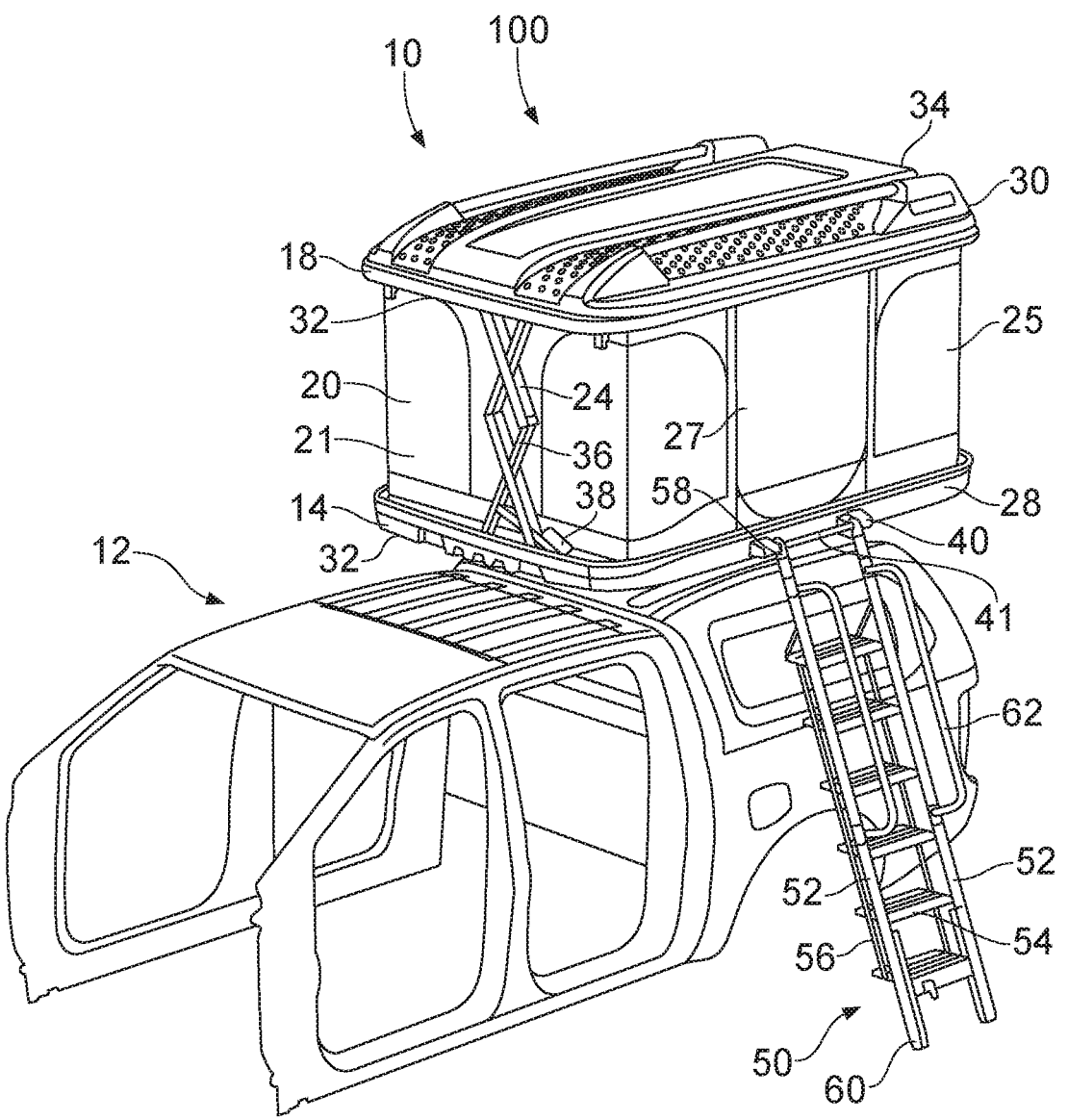
FIG. 1 is a perspective view of a rooftop tent mounted to a vehicle and in an open configuration.

In the drawings, reference numeral 10 generally designates a rooftop tent 10 for mounting to a vehicle 12. The rooftop tent 10 includes a base 14 configured for mounting to the vehicle 12, a cover 18 shaped to extend across the base 14, flexible walls 20 secured between the base 14 and the cover 18, at least one opening mechanism 24 configured to move the cover 18 relative to the base 14, the, or each, opening mechanism 24 secured between the base 14 and the cover 18 to be outside of, and separate from, the walls 20, and at least one retraction mechanism 26 (FIG. 4) configured to draw the walls 20 inwardly to be under the cover 18. The, or each, opening mechanism 24 and the, or each, retraction mechanism 26 are operable concurrently to move the cover 18 towards the base 14 and simultaneously draw the walls 20 inwardly. It will be appreciated that "inwardly" indicates a direction towards the inside of the tent 10, being a space bound by the walls 20.

Figure 2:
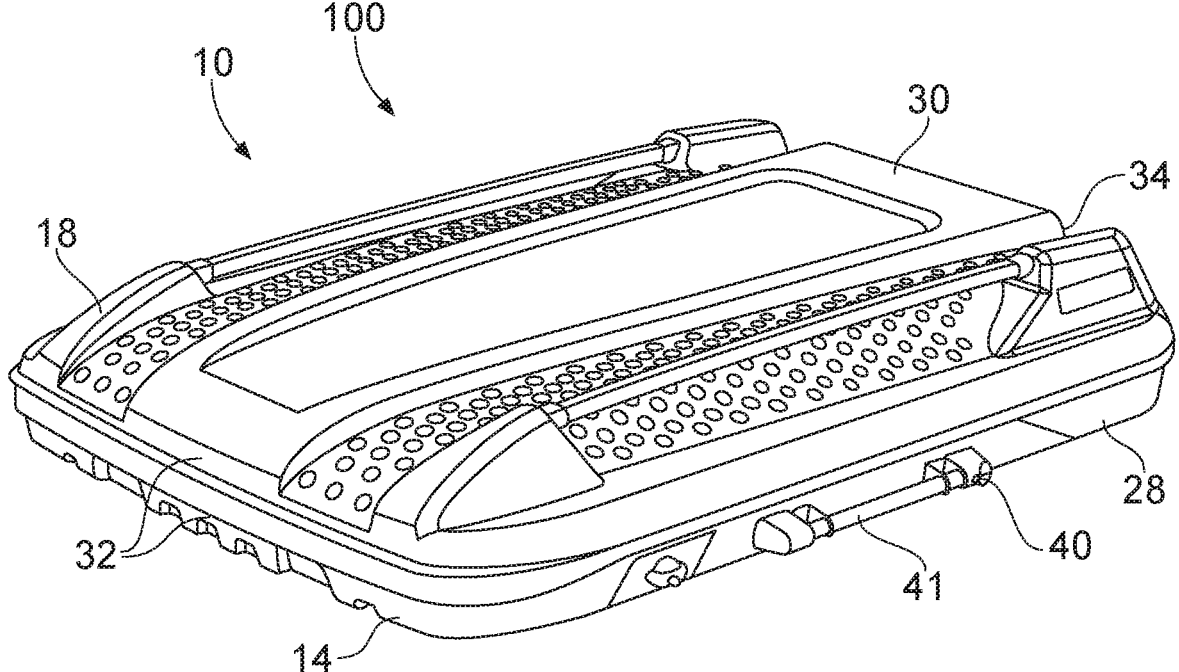
FIG. 2 is a perspective view of the rooftop tent shown in FIG. 1 in isolation and in a closed configuration.

The rooftop tent 10 may be transitioned between a first, or open, configuration (FIG. 1) and a second, or closed, configuration (FIG. 2). In the open configuration, the cover 18 is spaced from the base 14 to cause the walls 20 to extend, and may partially stretch, between the base 14 and the cover 18. This configuration defines an internal space within the walls 20, base 14 and cover 18 dimensioned to accommodate one or more users, such as in a lying or sitting position. In the closed configuration, the cover 18 is adjacent, or abutting, the base 14 with the walls arranged between, and within a peripheral region defined by each of, the cover 18 and base 14. This configuration defines a compact form suitable for storage or during transit, such as when the tent 10 is mounted on the vehicle 12 and the vehicle 12 is driven.

Figure 3:
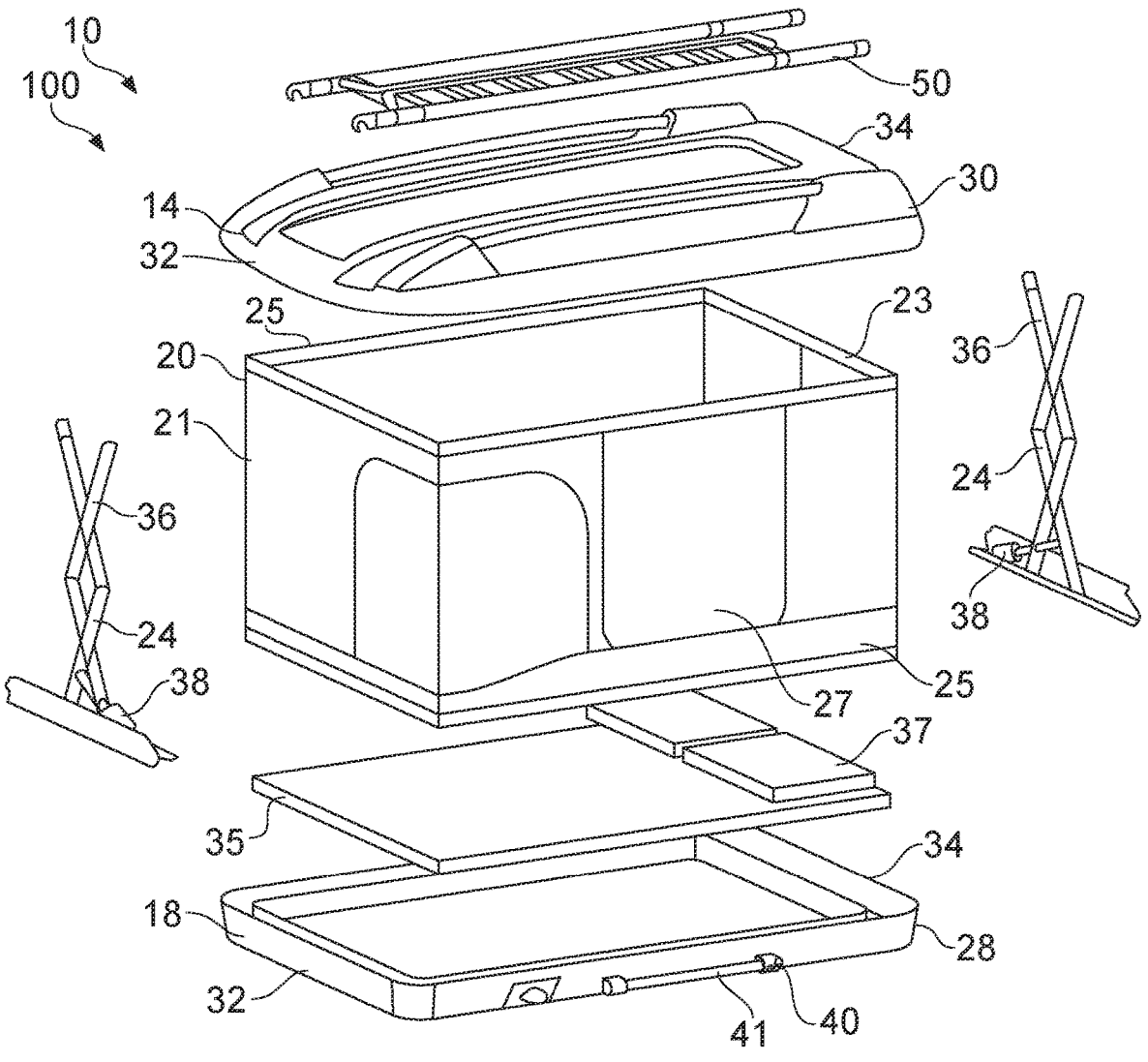
FIG. 3 is an exploded perspective view of the rooftop tent shown in previous figures.

Best shown in FIG. 3, in the illustrated embodiment, each of the base 14 and the cover 18 include a rigid shell 28, 30, such as formed from molded plastic or composite material. Each shell 28, 30 defines a shallow receptacle and is arranged to be opposed to each other so that the cover shell 30 overlaps, and/or seals against, the base shell 28, in the closed configuration, to inhibit dust or moisture ingress inside of the shells 28, 30 and travelling to the walls 20. Each shell 28, 30 may house a frame (not illustrated), such as formed from sheet metal and/or extrusions, to enhance rigidity of the base 14 and cover 18. The base 14 is typically configured to be mounted to the vehicle 12, such as being securable to a channel defined in a roof bar secured across the roof of the vehicle, or being gripped by a clamp mechanism secured to a roof bar or platform such as a roof rack or roof tray. In other embodiments (not illustrated), at least one of the base 14 and cover 18 may comprise a semi-soft structure, such as formed from a fabric stretched across a frame or a plurality of rigid members.

The walls 20 define a front wall 21, a rear wall 23, and opposed side walls 25. The walls 20 may be formed from a substantially continuous fabric sleeve fixed about the base 14 and the cover 18. One, or both, of the side walls 25 defines a door 27, typically being a zippered flap, operable to allow access inside the walls 20 in the open configuration. In other embodiments (not illustrated), the walls 20 are formed from discrete, joined sections of fabric, or other flexible material. In yet other embodiments (not illustrated), the walls 20 define a curved profile such that the walls 20 are formed from a singular sidewall wrapped around a periphery of the base 14 and the cover 18.

Each of the base 14 and the cover 18 define an operatively front end 32 and an operatively rear end 34. In the illustrated embodiment, and best shown in FIGS. 1 and 3, a pair of the opening mechanisms 24 are arranged to be spaced apart from each other at the front end 32 and rear end 34 to be external of, and typically spaced from, the walls 20. This arrangement of the mechanisms 24 optimises access to the door(s) 27 at the side walls 24. In other embodiments (not illustrated), the opening mechanisms 24 are arranged along one, or both, sides of the tent 10 between the front end 32 and the rear end 34, and spaced outside of the walls 20. This arrangement may be particularly applicable to embodiments where the base 14 and the cover 18 are pivotally connected, such as by a hinge arranged along one side, or at one of the ends 32, 34. Other embodiments (not illustrated), include a single opening mechanism 24 arranged at one of the ends 32, 34 or a side and operable to cause pivoting of the cover 18 relative to the base 14.

Each opening mechanism 24 is configured to be electrically powered and operable to tension the walls 20 between the base 14 and the cover 18. Each mechanism 24 may be specified to tension the walls 20 to a predefined limit, or range, such as being configured to move the cover shell 30 apart from the base shell 28 by a defined distance, within a tolerance, typically being +/−20 mm, to enhance rigidity of the tent 10 in the open configuration, such as to withstand wind. Best shown in the exploded view of FIG. 3, each mechanism 24 includes a scissor-lift type mechanism 36 which is driven by a linear actuator 38. Operation of the actuators 38 is controlled by a user interface element, in this embodiment being a push button 40, arranged adjacent a mount rail 41 secured to the base shell 28. In other embodiments (not illustrated), the user interface element is remotely located from the tent 10, such as carried by a remote controller, or depicted as a button by an application executable on a personal computing device, such as a smartphone, communicatively connected to the rooftop tent 10.

In the illustrated embodiment, the cover 18 is separate from the base 14. Moving the push button 40 in one direction causes the actuators 38 to operate simultaneously to move the cover 18 away or towards the base 14 in a linear direction. In other embodiments (not illustrated) where the cover 18 is pivotally connected to the base 14, operating the opening mechanism(s) 24 causes one end of the cover 18 to move along an arc. It will be appreciated that other opening mechanisms 24 configured to move the cover 18 relative to the base 14 are within the scope of this disclosure, including manually operable mechanisms, such as having a rotatable handle to allow winding the mechanism to cause movement of the cover 18 relative to the base 14. In some embodiments, one or both actuators 38 are configurable to be electrically and manually driven to allow operation of the actuator 38 in the event of electrical power failure.

Figure 4:
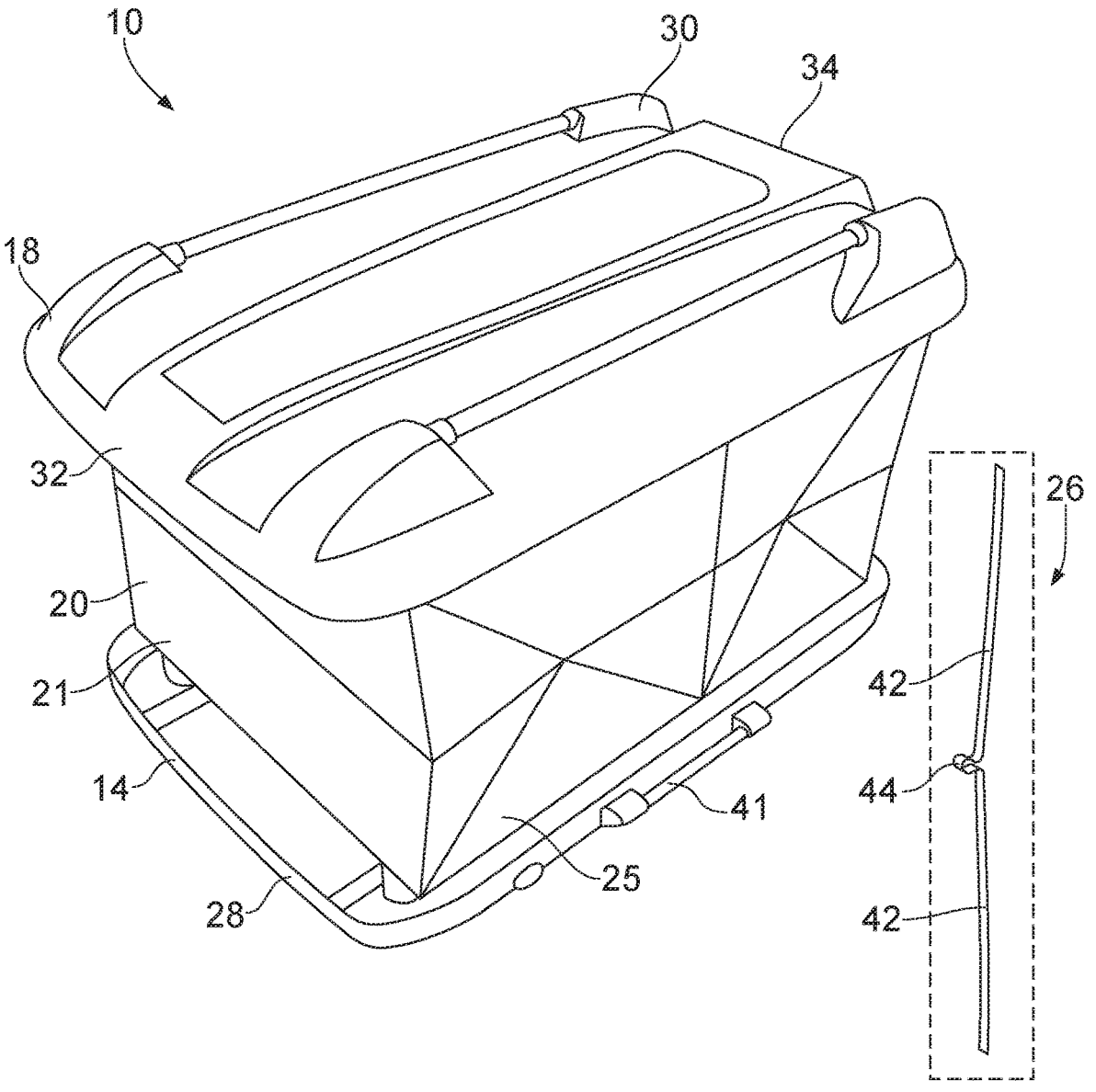
FIGS. 4 to 6 are perspective views of the rooftop tent shown in the previous figures illustrating the tent transitioning between the open and closed configurations.
Figure 5:
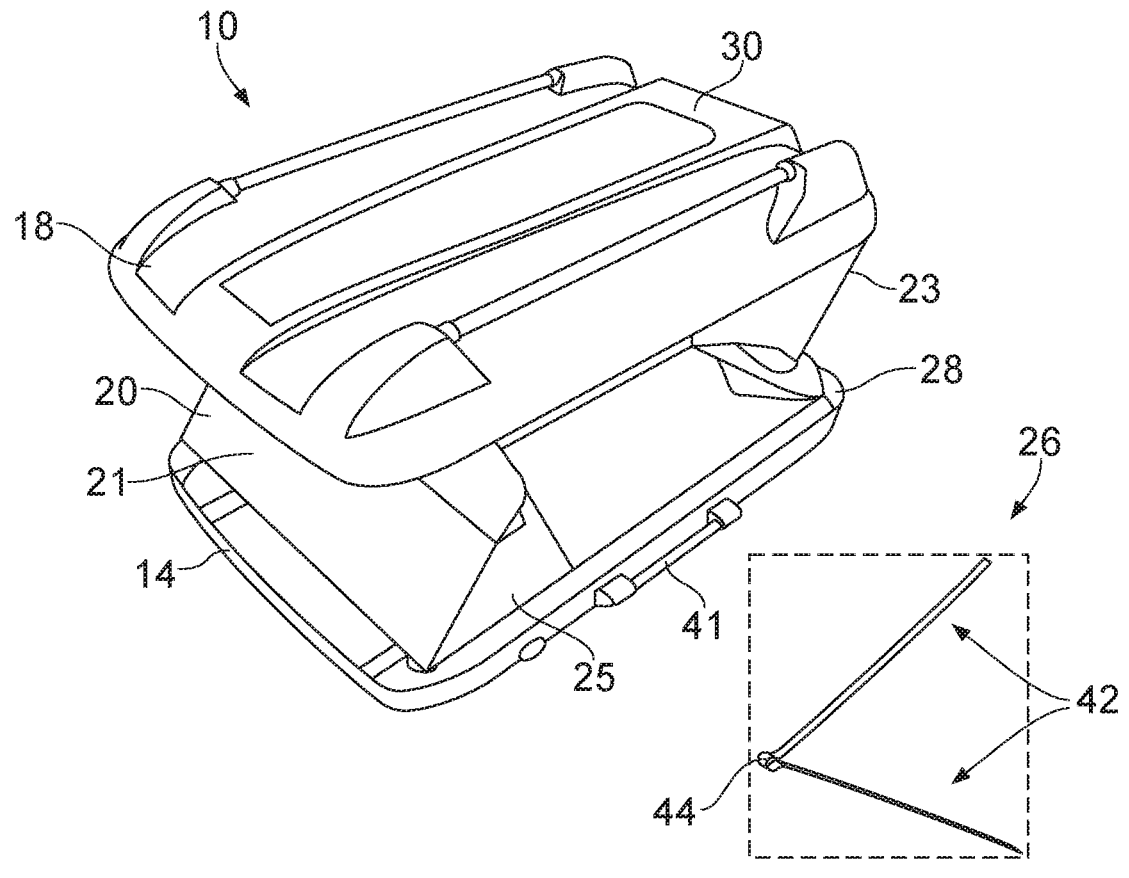
Figure 6:
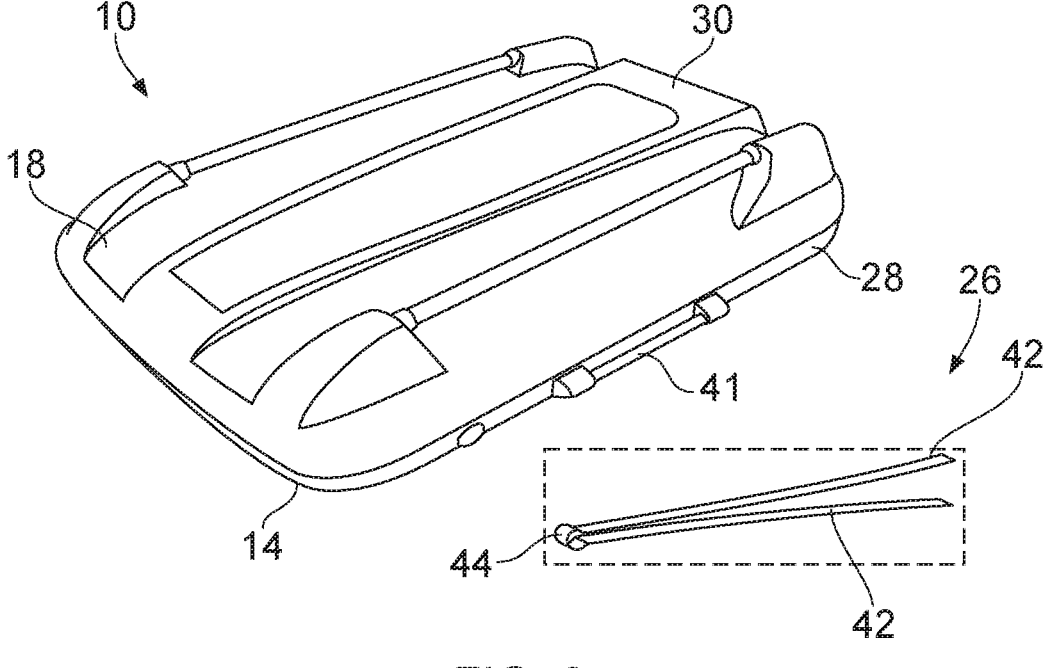

In the illustrated embodiment, the tent 10 includes a plurality of the retraction mechanisms 26 arranged about the walls 20. Each retraction mechanism 26 is secured to at least one of the walls 20. FIGS. 4 to 6 illustrate three stages of operating the retraction mechanisms 26 during transition from the open configuration (FIG. 4) to the closed configuration (FIG. 6). Each of FIGS. 4 to 6 include a detailed view showing the arrangement of one of the retraction mechanisms 26 in isolation. For simplicity, the opening mechanisms 24 are hidden in these figures. It will be appreciated that, in practice, operation of the opening mechanisms 24 causes operation of the retraction mechanisms 26, and therefore these mechanisms 24, 26 operate concurrently. It will also be appreciated that, in other embodiments (not illustrated), the tent 10 includes a single retraction mechanism 26 operably connected to at least some of the walls 20 and operable to draw the walls 20 inwardly.

Best shown in FIG. 4, each retraction mechanism 26 includes a pair of elongate members, in this embodiment in the form of a pair of arms 42, pivotable about an axis, such as defined by a hinge 44. Each arm 42 is typically formed from spring steel. It will be appreciated that the arm 42 may be formed from other resilient materials, such as a plastic. In other embodiments (not illustrated), each elongate member may include one or more of a plate, beam, slat, or webbed element, and/or may be connected to an elongate member of another retraction mechanism 26 to coordinate operation of the mechanisms 26.

Each retraction mechanism 26 is configured to bias the arms 42 towards each other. In use, the retraction mechanisms are arranged to fold inwardly, towards a centre of the roof top tent 10. In the illustrated embodiment, each hinge 44 is integrally joined to the arms 42, the hinge 44 comprising an over-molded, resiliently deformable elastomer structure shaped to urge the arms 42 together. In other embodiments (not illustrated), the arms 42 are each connected to a biased hinge assembly, such as including a torsion spring arranged to cause rotation of the arms 42 about the axis of the hinge assembly. In further embodiments (not illustrated), the hinge 44 is formed by portions of each arm 42 joined to each other and arranged to cause biasing about the axis of the hinge 44, such as having one or more rotational stop structures positioned to cause inward biasing.

Each retraction mechanism 26 is secured to one of the walls 21, 23, 25 such that operation of the mechanism 26 exerts force on one or more of the walls 21, 23, 25. Each arm 42 is joined at least partially along its length to one of the walls 20, in this embodiment being received in one or more sleeves (not shown) defined, or carried, by the walls 20. In other embodiments, the walls 20 carry hooks, straps, or similar securable structures, configured to receive and retain at least a portion of an arm 42, such as by forming a snap-fit to the arm 42.

FIG. 4 illustrates the tent 10 at the start of transition from the open configuration to the closed configuration. FIG. 5 illustrates the tent 10 partway through this transition. In both of these figures, the cover 18 is being moved by the opening mechanisms 26 (not shown) towards the base 14. Moving the cover 18 in this way allows each hinge 44 to cause the arms 42 to pivot towards each other. As each arm 42 is connected at least partially along its length to one of the walls 20, this causes the walls 20 to crumple and/or fold inwardly, to be retracted under the cover 18. FIGS. 4 and 5 illustrate fold lines scored into the walls 20 however it will be appreciated that these fold lines may be absent.

Best shown in FIG. 5, the arrangement of the retraction mechanisms 26 relative to each wall 20, with the hinge 44 positioned towards the inside of the tent 10, causes each wall 20 to be drawn inwardly. In this embodiment, a retraction mechanism 26 is arranged at each of the front wall 21 and rear 23, and a pair of mechanisms 26 are arranged at each side wall 25 spaced either side of the door 27. It will be appreciated that, in other embodiments, less, or more, retraction mechanisms 26 may be provided.

The configuration and arrangement of the retraction mechanisms 26 optimises drawings the walls 20 inwardly such that the walls 20 may be entirely positioned under the cover 18 in the closed configuration, as illustrated in FIG. 6. This may minimise any interaction required by the user to store the walls 20 between the shells 28, 30 in the closed configuration, such as stuffing the walls 20 inside of the shells 28, 30. This can enhance efficiency of packing down the tent 10.

The arrangement of the opening mechanisms 24 outside of the walls 20 minimises any obstruction to movement of the walls 20 caused by the retraction mechanisms 26 during transition to the closed configuration. This may assist with storing the walls 20 entirely within the periphery of the cover 18, and typically also within the periphery of the base 14, in the closed configuration. It may be advantageous to contain the walls 20 within the shells 28, 30 in the closed configuration such as to inhibit dust and moisture ingress to the accommodation area within the walls 20, which may contain bedding and/or other personal belongings.

Figure 7:
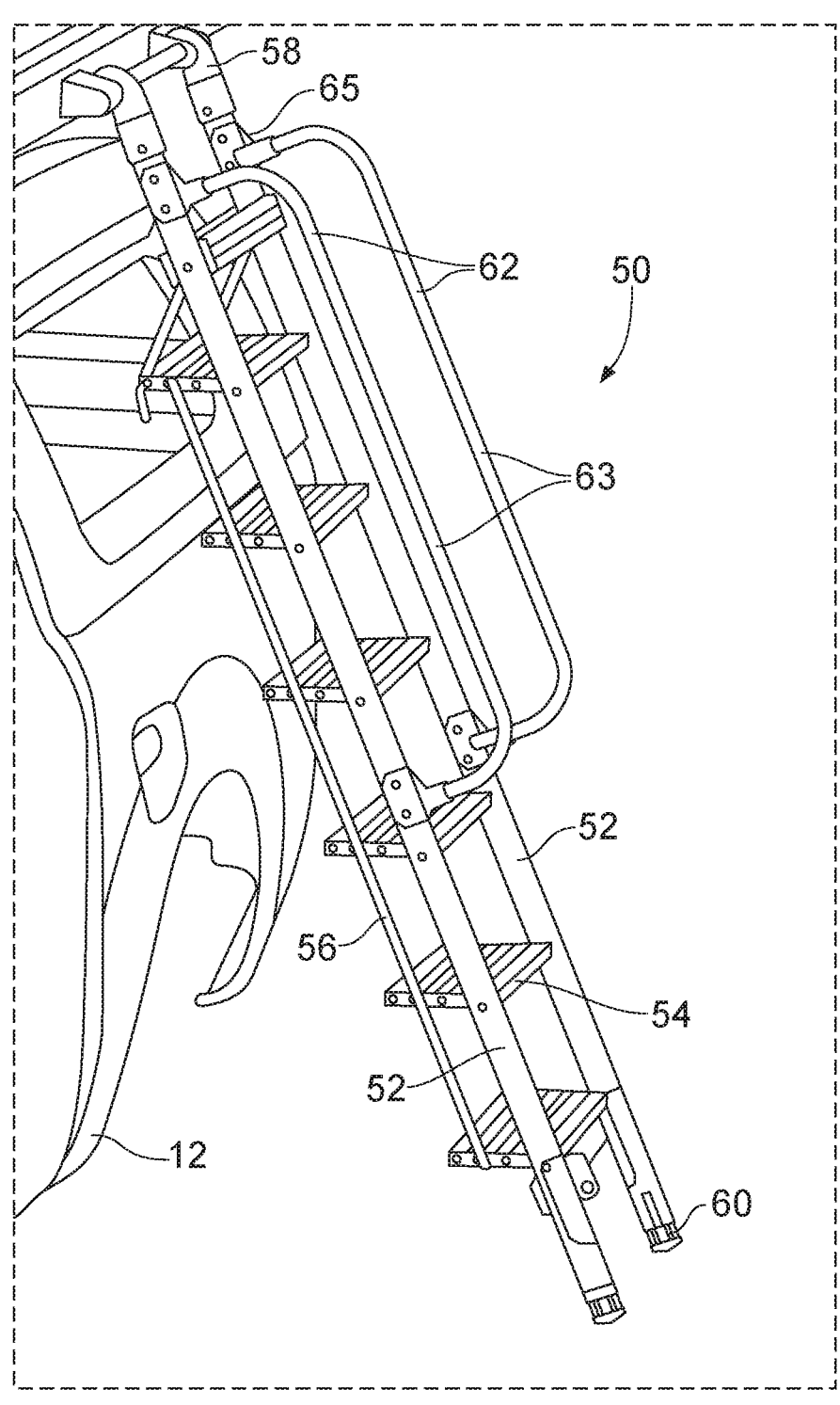
FIG. 7 is a perspective view of a ladder for allowing access to a rooftop tent mounted to a vehicle, the ladder in an access configuration.
Figure 8:
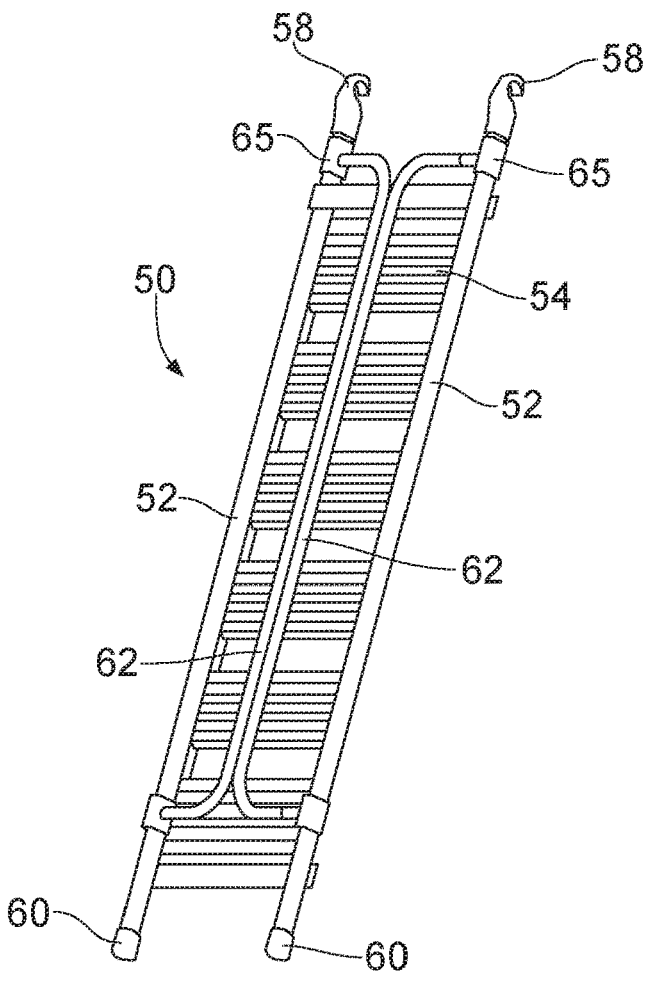
FIG. 8 is a perspective view of the ladder shown in FIG. 7 in a storage configuration.
Figure 9:
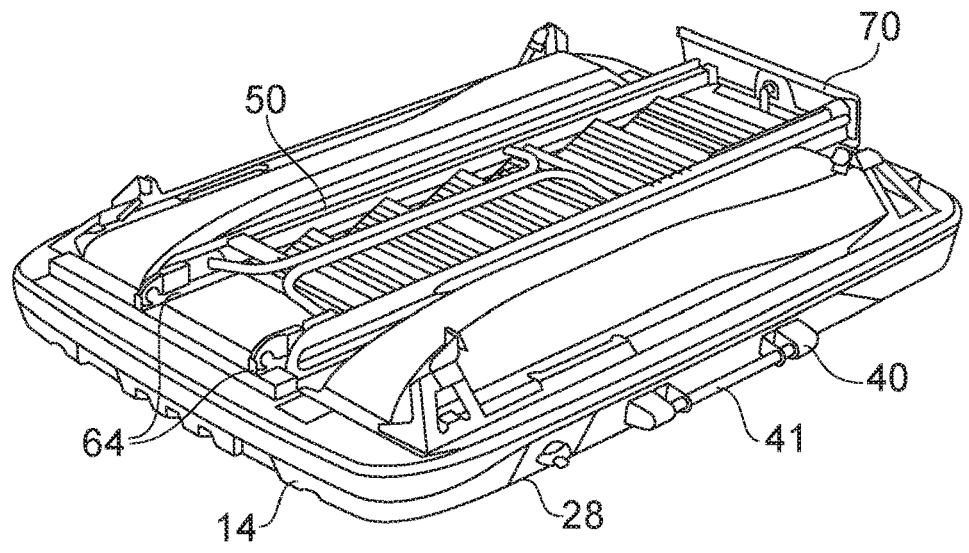
FIG. 9 is a perspective, partial view of the ladder shown in FIG. 8 arranged within the rooftop tent as shown in FIG. 2 in the closed configuration.
Figure 10:
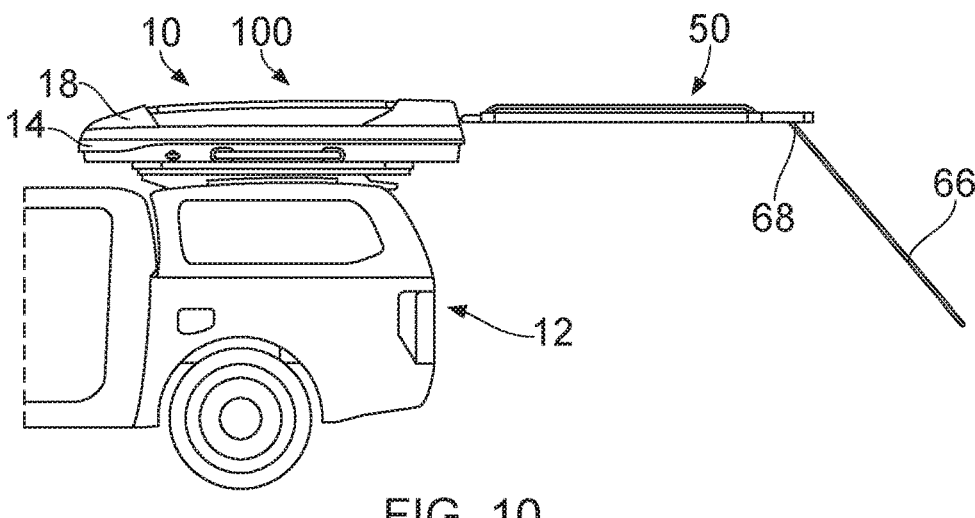
FIGS. 10 to 12 show side and detailed views, respectively, illustrating arranging the ladder shown in FIG. 8 within the rooftop tent in the closed configuration and mounted to the vehicle.
Figure 11:
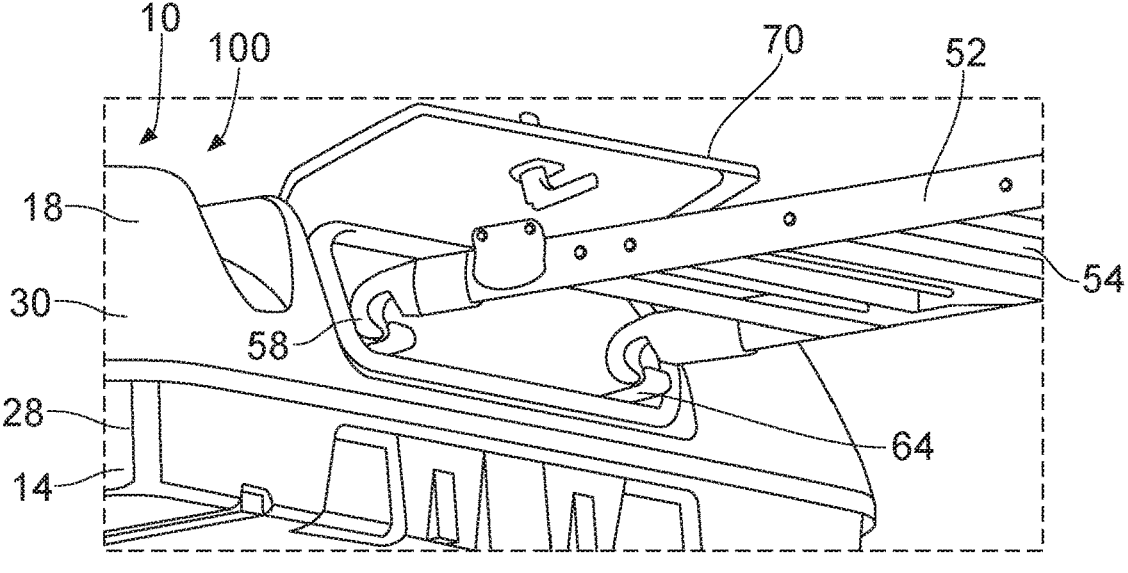

FIGS. 7 and 8 illustrate a foldable ladder 50 configured to allow access to the door 27 of the tent 10, or access to an alternative rooftop tent, such as the tent 100 illustrated in FIGS. 9 to 11 which is similar to the first illustrated embodiment of the tent 10 but does not include any retraction mechanism 26 to draw the walls 20 inwardly. The rooftop tent 100 shares features with the rooftop tent 10 and it will be appreciated that common reference numerals indicate common features unless indicated otherwise.

The ladder 50 includes a pair of spaced side rails 52 and a plurality of treads 54 secured between the side rails 52. Each tread 54 is pivotable relative to the side rails 52 to allow pivoting between a use configuration (FIG. 7), where the treads 54 are rotated to extend transversely to the rails 52 to allow supporting a user, and a storage configuration (FIG. 8), where the treads 54 are rotated to be substantially in line with the rails 52. In some embodiments, the treads 54 are dimensioned to define a substantial depth, such as defining a usable depth of around 15 cm, and in some embodiments around 25 cm, to provide a large surface area to support the user's foot and enhance the ergonomics of the ladder 50. At least one of the base 14 and the cover 18 is shaped to receive the ladder 50 when in the storage configuration, as described in greater detail below.

Best shown in FIG. 7, each tread 54 is pivotally connected to each of the side rails 52 and pivotally connected to a link bar 56. The bar 56 extends between all of the treads 54 to coordinate pivoting of the treads 54 towards or away from the side rails 52.

Also shown in FIG. 7, one end of each side rail 52 includes a hook 58, and the other end includes a levelling mechanism 60. The hook 58 is shaped to allow arranging about the mount rail 41 to retain the ladder 50 to the base 14. The levelling mechanisms 60 are operable to adjust the length of each side rail 52 to allow abutting the ground, the mechanisms 60 typically including one or more telescopic elements which are lockable to inhibit further relative movement. This may be useful where the ground is uneven meaning that the side rails 52 must define non-equal lengths to allow each to contact the ground.

The ladder 50 includes a pair of elongate handrails 62. Each handrail 62 is pivotally mounted to one of the side rails 52. The handrails 62 are pivotable between a storage position (FIG. 8), where the handrails 62 are rotated towards each other and the treads 54, and a use position (FIG. 7), where the handrails 62 are rotated apart from each other to allow being grasped by a user supported on the treads 54. In the storage position, the handrails 62 are rotated to abut, or be adjacent to, the treads 54, in the storage configuration, such that the ladder 50 defines a substantially flat structure optimised for being stored within the base 14 or cover 18. In the use position, the handrails 62 are arranged relative to the side rails 52, in the use configuration, such that a central portion 63 of each handrail 62 is spaced from, and extends parallel to, the side rail 52 to allow being gripped by the user. This arrangement can further ergonomically optimise the ladder 50, providing a sturdy structure able to firmly support the user.

In some embodiments, the ladder 50 includes a pair of locking mechanisms 65. Each locking mechanism 65 is secured to one of the side rails 52 and arranged at an end of one of the handrails 62, and is operable to rotationally lock the handrail 62 relative to the associated side rail 52 in the use position or in the storage position. Operating the locking mechanisms 65 may also enhance sturdiness of the ladder 50 in the use configuration.

FIG. 9 shows the tent 10, 100 in the closed configuration and with the cover shell 30 hidden to allow viewing the ladder 50 stowed within the space defined by the cover 18. The cover 18 defines a recess shaped to receive the ladder 50, in the storage configuration, and a pair of spaced tracks 64 arranged to support the ladder 50. Each track 64 is shaped and arranged to support one of the side rails 52 to allow the ladder 50 to slide along the tracks 64. Additionally or alternatively, the cover 18 may include rollers or bearings to support the ladder 50. It will be appreciated that the base 14 may be configured in the same way to allow stowing the ladder 50 within, or otherwise be carried by, or secured to, the base 14.

FIG. 10 illustrates stowing the ladder 50 within the cover 18 of the tent 10, 100, where the ladder 50 is lifted to be generally parallel with the tracks 64, and slid along the tracks 64 to be received within the cover 18. Moving the ladder 50 along the tracks 64 may involve using a pole 66 having a hook 68. In embodiments including the pole 66, this is also stowable in the recess of the cover 18.

Figure 12:
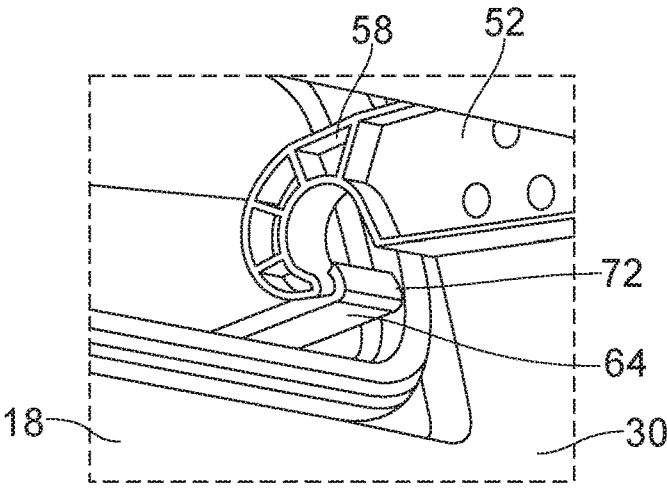

FIGS. 11 and 12 illustrate retrieving the ladder 50 from within the cover 18 of the tent 10, 100. FIG. 11 shows a hatch 70 pivotally mounted to the cover shell 30 and arranged to allow access to the ladder 50 to slide the ladder 50 out of the recess and away from the cover 18. Best shown in FIG. 12, when the ladder 50 is entirely withdrawn, the hooks 58 of the ladder 50 catch on a lip 72 arranged at the end of each track 64. This inhibits further linear relative movement of the ladder 50 and tracks 64, and allows pivoting the ladder 50 about the lips 72 and towards the ground.

The rooftop tent 100 includes a base 14 configured for mounting to the vehicle 12, a cover 18 shaped to cover the base 14, flexible walls 20 secured between the base 14 and the cover 18, at least one opening mechanism 24 configured to move the cover 18 relative to the base 14, and a foldable ladder 50 having a pair of spaced side rails 52 and a plurality of treads 54 secured between the side rails 51. Each tread 54 is pivotable relative to the side rails 52 to allow pivoting between a use configuration, where the treads 54 are rotated to extend transversely to the rails 52 to allow supporting a user, and a storage configuration, where the treads 54 are rotated to be substantially in line with the rails 52. At least one of the base 14 and the cover 18 is shaped to receive the ladder 50 when in the storage configuration.

Use of the tent 10 involves a user operating the push button 40 to cause the opening mechanisms 24 to elevate the cover 18 from the base 14 and extend the walls 20 between the base 14 and the cover 18. When the cover 18 is moved to a maximum height position, and the tent 10 is in the open configuration, the user accesses the door 27, typically by positioning and climbing the ladder 50, and enters the inside of the tent 10 to lie or sit on bedding, such as a mattress 35 and pillows 37 (FIG. 3) which are typically stored within the tent 10.

Before driving the vehicle 12 with the tent 10 mounted to the roof and in the open configuration, the user operates the push button 40 to cause the opening mechanisms 24 to move the cover 18 towards the base 14. This causes concurrent operation of the retraction mechanisms 26 to draw the walls 20 inwardly. When the cover 18 is moved to a minimum height position, and the tent 10 is in the closed configuration, the user may drive the vehicle 12.

Use of the tent 100 involves a user opening the hatch 70 and sliding the ladder 50 out of the cover 18. The user rotates the treads 54 relative to the side rails 52 in a first direction, and rotates the handrails 62 about the side rails in a second, perpendicular direction, to arrange the ladder 50 in the use configuration. The user then attaches the hooks 58 of the ladder 50 to the mount rail 41 of the base 14 and, if necessary, operates one or both levelling mechanisms 60 to securely position the ladder 50 on the ground. The user operates the push button 40 to cause the opening mechanisms 24 to elevate the cover 18 from the base 14 and extend the walls 20 between the base 14 and the cover 18. When the cover 18 is moved to a maximum height position, and the tent 10 is in the open configuration, the user climbs the ladder 50, by stepping on the treads 54, to access the door 27 and enter the inside of the tent 10 to lie or sit on bedding, such as the mattress 35 and pillows 37.

Before driving the vehicle 12 with the tent 100 mounted to the roof and in the open configuration, the user operates the slide button 40 to cause the opening mechanisms 24 to move the cover 18 towards the base 14. When the cover 18 is moved to a minimum height position, and the tent 10 is in the closed configuration. The user then disengages the ladder 50 from the base 14, rotates the treads 54 and handrails 62 relative to the side rails 52 to arrange the ladder in the storage configuration, slides the ladder 50 into the recess defined in the cover 18, and closes the hatch 70. The user may then drive the vehicle 12.

The tent 10, 100 has at least one opening mechanism 24 arranged outside of the walls 20 to minimise interference with the walls 20 when operating the at least one opening mechanism 24 to transition the tent 10 from the open configuration to the closed configuration, and vice versa. This can enhance reliability of reconfiguring the tent 10, 100 between open and closes configurations by decreasing the chance of the wall 20 fabric being trapped, or otherwise entangled, in the mechanism 24, and/or enhance reliability of operation of the mechanism(s) 24 by minimising the number of moving parts, and allowing access to the mechanism(s) to resolve any mechanical issue and/or operate the mechanism(s) manually should there be an electrical power failure.

The tent 10 includes at least one retraction mechanism 26 which is operable concurrently with the at least one opening mechanism 24 to withdraw the walls 20 inwardly, under the cover 18. The combined operation of the opening mechanism(s) 24 and retraction mechanism(s) 26 can enhance reliability and/or efficiency of erecting and packing away the tent 10, which can also enhance user experience.

The tent 100 includes a foldable ladder 50 which is conveniently storable in one of the base 14 and the cover 18. The ladder 50 is readily removable from its stowed location and reconfigurable from a storage configuration, having a substantially flat profile with the treads 54 rotated substantially in line with the side rails 52, to a use configuration, with the treads 54 rotate to be transverse to the side rails 52, to allow a user to access the tent 100 mounted to the roof of the vehicle 12. In the use configuration, the ladder 50 is ergonomically optimised, potentially having deep treads 54 to support the user. In some embodiments, the ladder 50 also has sturdy handrails 62 to further enhance user safety and experience. In some embodiments, the ladder 50 also has independently operable levelling mechanisms 60 to enhance stability of the ladder 50.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A rooftop tent for mounting to a vehicle, the rooftop tent including:
   a base configured for mounting to the vehicle;
   a cover shaped to extend across the base;
   flexible walls secured between the base and the cover;
   at least one opening mechanism configured to move the cover relative to the base, the, or each, opening mechanism secured between the base and the cover to be outside of, and separate from, the walls; and
   a plurality of retraction mechanisms configured to draw the walls inwardly to be under the cover, each retraction mechanism including a pair of elongate members pivotable about a hinge and arranged such that each elongate member is secured to at least one of the walls, wherein operating the retraction mechanisms pivots the elongate members towards each other to draw the walls inwardly, and
   the, or each, opening mechanism and the retraction mechanisms are operable concurrently to move the cover towards the base and simultaneously draw the walls inwardly.

2. The rooftop tent of claim 1, wherein each of the base and the cover define an operatively front end and an operatively rear end, and the walls define a door at a side between the front end and rear end, and a pair of the opening mechanisms are spaced apart such that each opening mechanism is arranged at one of the front end and the rear end.

3. The rooftop tent of claim 1, wherein the, or each, opening mechanism includes an electrically powered mechanism operable to tension the walls between the cover and the base.

4. The rooftop tent of claim 1, wherein the cover is arranged separately from the base, and the, or each, opening mechanism is arranged to move the cover towards and away from the base in a linear direction.

5. The rooftop tent of claim 1, wherein the walls define opposed side walls, a front wall, and a rear wall, and at least one of the retraction mechanisms is secured to each of the walls.

6. The rooftop tent of claim 1, wherein each elongate member includes an arm, and the walls define sleeves shaped to receive the arms.

7. The rooftop tent of claim 1, wherein the hinge of each retraction mechanism biases the elongate members towards each other.

8. The rooftop tent of claim 1, further including a foldable ladder, the ladder having a pair of spaced side rails and a plurality of treads secured between the side rails, each tread being pivotable relative to the side rails to allow pivoting between a use configuration, where the treads are rotated to extend transversely to the rails to allow supporting a user, and a storage configuration, where the treads are rotated to be substantially in line with the rails, and wherein at least one of the base and the cover is shaped to receive the ladder when in the storage configuration.

9. The rooftop tent of claim 8, wherein the ladder includes a pair of elongate handrails, each handrail pivotally mounted to one of the side rails, the handrails pivotable between a storage position, where the handrails are rotated towards each other and the treads, and a use position, where the handrails are rotated apart from each other to allow being grasped by a user supported on the treads.

10. The rooftop tent of claim 9, wherein the ladder includes a pair of locking mechanisms, each locking mechanism arranged at an end of one of the handrails and operable to rotationally lock the handrail relative to the side rail in the use position or in the storage position.

11. The rooftop tent of claim 8, wherein the cover is configured to carry the ladder and includes a pair of tracks arranged to support the ladder, and wherein the ladder is slidable along the tracks.

12. The rooftop tent of claim 11, wherein each side rail includes a hook arranged at one end, and each track defines a lip, and wherein sliding the ladder along the tracks in a direction away from the cover causes the hooks to catch on the lips to inhibit further linear movement, and allow pivoting the ladder about the lip and towards the ground.

13. The rooftop tent of claim 8, wherein each side rail of the ladder includes a levelling mechanism to allow adjusting a length of the side rail.

14. A rooftop tent for mounting to a vehicle, the rooftop tent including:
a base configured for mounting to the vehicle;
a cover shaped to cover the base;
flexible walls secured between the base and the cover;
at least one opening mechanism configured to move the cover relative to the base;
a plurality of retraction mechanisms configured to draw the walls inwardly to be under the cover, each retraction mechanism including a pair of elongate members pivotable about a hinge and arranged such that each elongate member is secured to at least one of the walls, wherein operating the retraction mechanisms pivots the elongate members towards each other to draw the walls inwardly; and
a foldable ladder having a pair of spaced side rails and a plurality of treads secured between the side rails, each tread being pivotable relative to the side rails to allow pivoting between a use configuration, where the treads are rotated to extend transversely to the rails to allow supporting a user, and a storage configuration, where the treads are rotated to be substantially in line with the rails,
wherein at least one of the base and the cover is shaped to receive the ladder when in the storage configuration.

15. The rooftop tent of claim 14, wherein the ladder includes a pair of elongate handrails, each handrail pivotally mounted to one of the side rails, the handrails pivotable between a storage position, where the handrails are rotated towards each other and the treads, and a use position, where the handrails are rotated apart from each other to allow being grasped by a user supported on the treads.

16. The rooftop tent of claim 15, wherein the ladder includes a pair of locking mechanisms, each locking mechanism arranged at an end of one of the handrails and operable to rotationally lock the handrail relative to the side rail in the use position or in the storage position.

17. The rooftop tent of claim 14, wherein the cover is configured to carry the ladder and includes a pair of tracks arranged to support the ladder, and wherein the ladder is configured to slide along the tracks.

18. The rooftop tent of claim 17, wherein each side rail includes a hook arranged at one end, and each track defines a lip, and wherein sliding the ladder along the tracks in a direction away from the cover causes the hooks to catch on the lips to inhibit further linear movement, and allow pivoting the ladder about the lip and towards the ground.

19. The rooftop tent of claim 14, wherein each side rail of the ladder includes a levelling mechanism to allow adjusting a length of the side rail.

\* \* \* \* \*